United States Patent [19]

Loewy

[11] Patent Number: 5,011,411

[45] Date of Patent: Apr. 30, 1991

[54] METHOD OF MAKING A NON-REPETITIVE MODULAR DESIGN

[76] Inventor: Andreas F. Loewy, 620 Coolidge St., Lafayette, La. 70503

[21] Appl. No.: 429,633

[22] Filed: Oct. 31, 1989

Related U.S. Application Data

[63] Continuation-in-part of Ser. No. 195,032, May 17, 1988, abandoned.

[51] Int. Cl.$^5$ ............................................. G09B 1/32
[52] U.S. Cl. ...................................... 434/96; 434/72
[58] Field of Search .................. 434/96, 74, 81, 95; 273/292, 293, 296, 157 R

[56] References Cited

U.S. PATENT DOCUMENTS

| | | |
|---|---|---|
| D.184,396 | 2/1959 | Jenkins . |
| 741,142 | 10/1903 | Keller . |
| 1,268,391 | 6/1918 | Schepmoes . |
| 1,453,728 | 5/1923 | Rhodes . |
| 1,973,564 | 9/1934 | Graham . |
| 2,881,537 | 4/1959 | Dreman . |
| 3,464,145 | 9/1969 | Martin . |
| 3,643,956 | 2/1972 | Bovasso ........................ 273/130 R |
| 3,755,923 | 9/1973 | Krahn .................................. 434/96 |
| 4,373,730 | 2/1983 | Koltz .................................. 273/155 |

FOREIGN PATENT DOCUMENTS

| | | |
|---|---|---|
| 2345184 | 7/1977 | France .................................. 434/81 |
| 1197895 | 7/1970 | United Kingdom .................. 434/96 |

OTHER PUBLICATIONS

"Scientific American" Jan. 1977, p. 7 ©1977.
"Artists Learn How to Paint by Computer" Susan Carey 1982 p. 31, 52 Wed., Jun. 9, 1982 *The Wall St. Journ.*

*Primary Examiner*—William H. Grieb
*Attorney, Agent, or Firm*—Ostrolenk, Faber, Gerb & Soffen

[57] ABSTRACT

This invention is a method making a non-repetitive modular design. The design is created by assembling a plurality of substantially identical modules to cover a surface. Each module has the shape of a polygon, especially a regular polygon, such as a square. The design of each module is created in the following manner. First, one selects a set of points, disposed symmetrically around the midpoint of a side of the polygon, and duplicates the same pattern of points for the remaining sides. Then, one connects every pair of points with a line, such that the lines so drawn form a pattern which is not symmetrical around any imaginary straight line joining any pair of vertices of the polygon. The spaces between lines, or between one or more lines and one or more sides of the polygon, can be filled in with a color, or with any other design element. To make the final design, one provides a plurality of such modules, and arranges them, with random orientations, to cover a surface. The design is non-repetitive, and any orientation of the individual modules will produce a valid design. The appearance of the design is varied by changing the orientation of one or more of the modules. In general, the appearance of the overall design is quite different from that of each of the modules. The modules made according to the invention can be used as floor tiles, or they can be otherwise secured permanently to a solid substrate for decorative purposes.

50 Claims, 5 Drawing Sheets

METHOD OF MAKING A NON-REPETITIVE MODULAR DESIGN

CROSS-REFERENCE TO PRIOR APPLICATION

This is a Continuation-in-Part of U.S. patent application Ser. No. 07/195,032, filed May 17, 1988, now abandoned.

BACKGROUND OF THE INVENTION

The present invention relates to designs, and provides a method for making a unique design which has many practical applications.

It has been known, in the prior art, to make designs from a plurality of blocks or squares. Thus, U.S. Pat. No. 1,453,728 shows a method of making an ornamental design from a set of squares, the design being built up from selected portions of circular arcs. U.S. Pat. No. 1,973,564 discloses a set of blocks, each having different patterns, the blocks being assembled to form ornamental designs.

Other patents showing the use of blocks or squares to create larger designs include U.S. Pat. Nos. 741,142, 1,268,391, 2,881,537, and 3,464,145.

U.S. Pat. No. 3,755,923 shows a design which includes identical and regular polygons in some cases and non-identical and irregular polygons in other cases.

U.S. Pat. No. 3,643,956 shows a design having identical polygons. However, the designs on the polygon are bilaterally symmetrical and consist of single lines connecting the midpoints of the sides of the polygons.

The present invention describes a method of making a design, the design being formed of a large number of substantially identical squares or polygons. That is, the design of the present invention is modular but non-repetitive. Thus, virtually every possible orientation of the modules yields a meaningful variation of the design. The designs made according to the present invention can therefore be realized with virtually endless variety. One advantage of modular construction is that the design can be mass-produced and attached permanently to a solid substrate. Moreover, the designs made according to the present invention can be installed by comparatively unskilled persons, because the orientation of the modules is not critical and, in fact, creates a variety of designs.

SUMMARY OF THE INVENTION

The design made according to the method of the present invention includes a relatively large number of substantially identical modules, arranged randomly to cover a surface. Each module has the shape of a regular polygon, such as a square. The design can be made with modules having the shape of any regular polygon which, when combined with other polygons having the same size and shape, can cover a given surface area without leaving "holes".

Each module is made in the following manner. Assume that the regular polygon has n sides. First, one chooses a set of points on one of the sides of the polygon, the points being distributed symmetrically around the midpoint of the side. Then, one duplicates this arrangement of points on each of the remaining sides. Next, one connects pairs of points with lines, such that every point is connected to one line. The lines can be straight or curved, but they must be continuous. The lines are drawn such that the resulting pattern is not symmetrical around any imaginary straight line joining any pair of vertices of the polygon. Finally, one can optionally fill in some or all of the spaces defined by pairs of lines, or by one or more lines and one or more sides of the polygon, with color or with some other design element.

The modules made according to the above procedure are then arranged randomly to cover a given surface, and may be attached permanently to a solid substrate. Such random arrangements of the modules form larger designs which do not repeat themselves across the surface. The appearances of the larger designs are, in general, quite different from that of the module used to make them. Varying the orientation of one or more of the modules changes the overall appearance of the design, and each such variation is, in theory, equally usable. The selection of the points and lines, described above, for each module, assures that there is always continuity of the design from one module to the next.

It is therefore an object of the invention to provide a method of making a multiplicity of designs which are formed of a plurality of substantially identical modules.

It is another object to provide a method of making a modular design which is non-repetitive across a given area.

It is another object to provide a method of making a modular design which exhibits continuity from one module to the next.

It is another object to provide a method of making a large design which is made of a set of smaller modules, and wherein the appearance of the larger design is, in general, substantially different from that of the module.

It is another object to provide a method of making a non-repetitive modular design which can be realized in a virtually endless variety of ways.

It is another object to provide a method of making a non-repetitive modular design which can be created and/or assembled by persons having limited artistic ability, or by computers.

It is another object to provide a method of making a modular design, the modules of which can be produced in quantity, for attachment to a solid substrate, so as to provide designs for furniture and interior structures, and to decorate other surfaces.

It is another object to provide a method of making a modular design, the modules of which can also be used to make toys and games.

Other objects and advantages of the present invention will be apparent to those skilled in the art, from a reading of the following brief description of the drawings, the detailed description of the invention, and the appended claims.

BRIEF DESCRIPTION OF THE DRAWINGS

FIGS. 1a through 1f are diagrams showing the steps of making a module for the design of the present invention, the module having the shape of a square.

DETAILED DESCRIPTION OF THE INVENTION

The present invention is a method of making a non-repetitive modular design for a surface. By "modular", it is meant that the design is formed from a plurality of substantially identical units or modules. The term "non-repetitive" means that it is possible to find two regions of the surface having designs which are different.

The modules used to form designs according to the present invention preferably have the shape of regular polygons, and the modules are of substantially the same size. In the examples of FIGS. 1-4, the polygons are squares. However, one can also use any other regular polygon which is capable of being combined with other polygons, of the same size and shape, to cover an arbitrary surface area, without leaving "holes". While the following examples show square modules, the invention should not be deemed limited to squares.

Figure 1A:
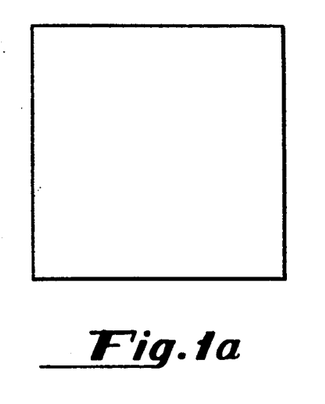
Figure 1B:
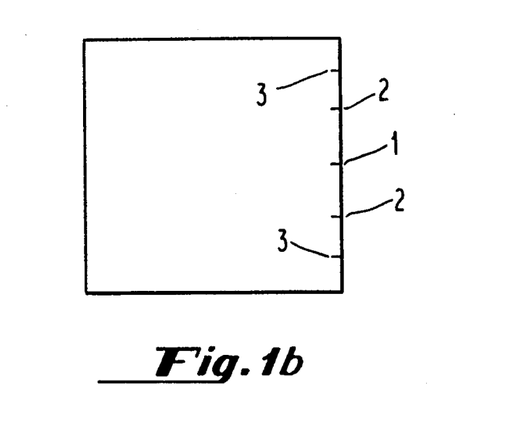

FIGS. 1a through 1f illustrate the method of making a square module according to the invention. One begins with the blank square, shown in FIG. 1a. First one marks off the midpoint 1 of one of the sides of the square. Next, one chooses a set of points, on the same side, these points being distributed symmetrically around the midpoint. The selected set of points therefore does not include the midpoint. In FIG. 1b, there is shown a first pair of points 2 and a second pair of points 3. One needs at least one pair of points, but there may be as many such pairs as desired. The larger the number of pairs, the more complex the final design will be. In every case, there is an even number of points on the side of the square, not counting the midpoint.

Figure 1C:
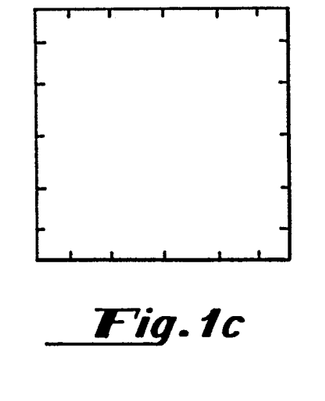

After the points on a side of the square have been selected, the same pattern of points is duplicated onto each of the remaining sides, as shown in FIG. 1c.

Figure 1D:
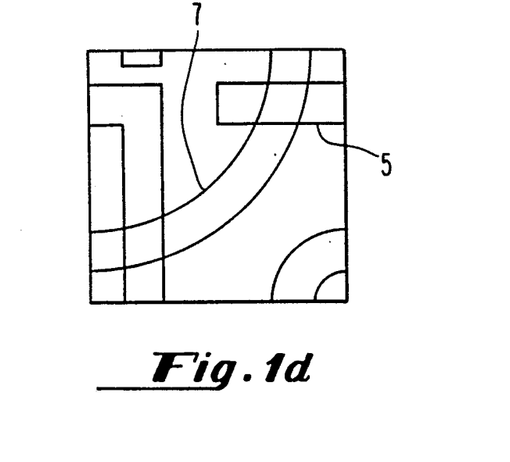

The next step is to draw lines connecting all the pairs of points, except the midpoints, as shown in FIG. 1d. Each point must be connected to another point, by a single, visually-continuous line. The lines can be straight or curved, or may even have both straight and curved portions, but the lines must be continuous. A given line may connect any two points, whether or not those points are on the same side of the square. Thus, for example, line 5 connects two points on the same side, while line 7 connects two points on different sides. It is permissible for the lines to cross. This in FIG. 1d, line 5 crosses line 7. Also, there is no requirement that any of the liens be parallel to each other.

The lines can be located virtually anywhere within the square, provided that each line connects a pair of points, and provided that the resulting pattern of lines is not symmetrical around any imaginary straight line joining any pair of vertices of the polygon.

It is also possible to practice the invention with a less stringent restriction on the placement of the lines. This less stringent requirement is that the final design of the square not be rotationally invariant. That is, the design must be such that if the square is rotated by some integral multiple of 90°, the design will change. The design shown in FIG. 1d clearly is not identical to the design obtained by rotation by 90°, 180°, or 270°.

Figure 1E:
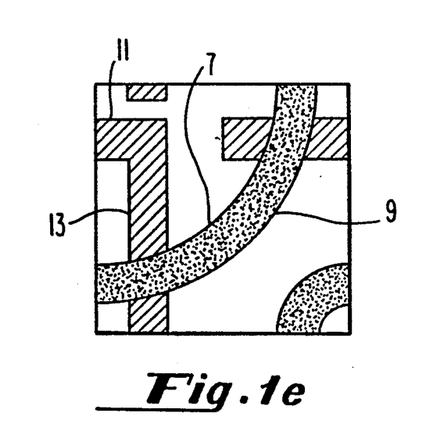

The module shown in FIG. 1d could be deemed complete. However, it is often desirable to put more ornamentation into the module, as shown in FIG. 1e. One may thus fill some or all of the spaces defined by pairs of lines, and/or one or more sides of the square, with a color, or with a subsidiary design element. For example, in FIG. 1e, the space between lines 7 and 9 is filled with a speckled design, while the space between lines 11 and 13 is filled with cross-hatching. These internal design elements are exemplary and not limiting; it is possible to fill any of the spaces with virtually any design element imaginable. Such design elements may include solid colors, dots, regular or irregular grids, blank space, and many others. These design elements may also be combined. Also, the use of such a design element is not integral to the principle of the invention, but may be added to enhance the clarity or the aesthetic appeal of the design.

Figure 1F:
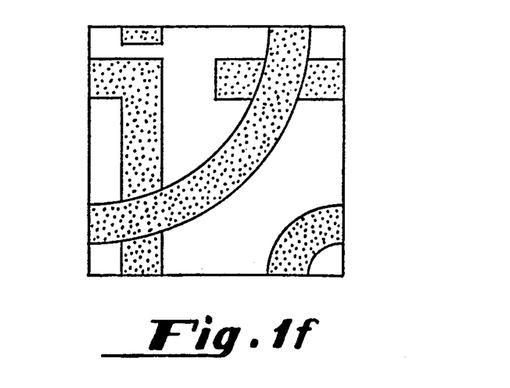
FIG. 1f is an alternative to the step shown in FIG. 1e.

The ornamentation of FIG. 1e has the feature that, when the module is positioned adjacent a similar module, the cross-hatching may clash with the speckled design at certain locations. If such clashing is not desired, then the spaces between lines may be filled with the same design element, as is illustrated in FIG. 1f. Thus, FIG. 1f is an alternative to FIG. 1e. FIG. 1f contains the speckled design element only.

The module produced according to the method described above is then duplicated, and the result is a plurality of substantially identical modules. These modules are then arranged randomly to cover an arbitrary surface. When so arranged, the modules form a larger design which, in general, appears quite different from the design of the individual modules. The symmetry of the placement of the points on the sides of the square insures that the design will have continuity from one module to the next. Although the original module is entirely asymmetric, the pattern formed by the plurality of identical modules exhibits a surprising degree of continuity.

Figure 2A:
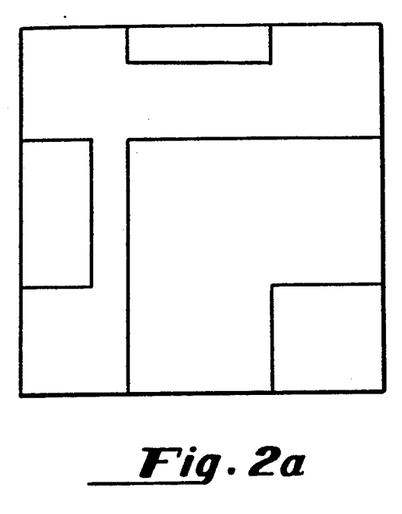
FIG. 2a is a drawing of a square module, made according to the method of the present invention.
Figure 2B:
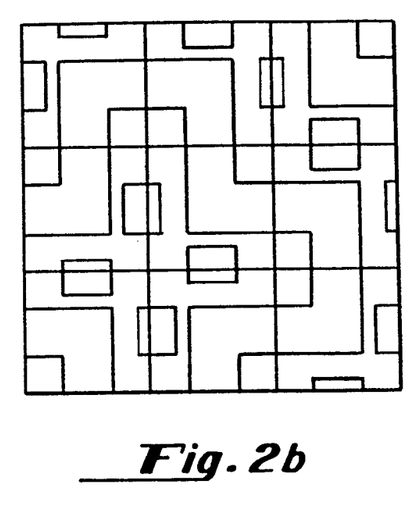
FIGS. 2b, 2c, and 2d are drawings of three designs made from the module of FIG. 2a, each design having nine modules.
Figure 2C:
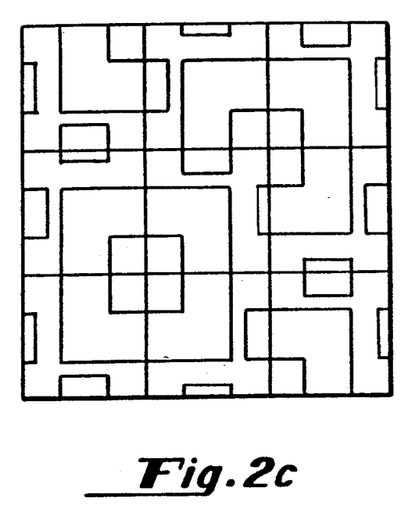
Figure 2D:
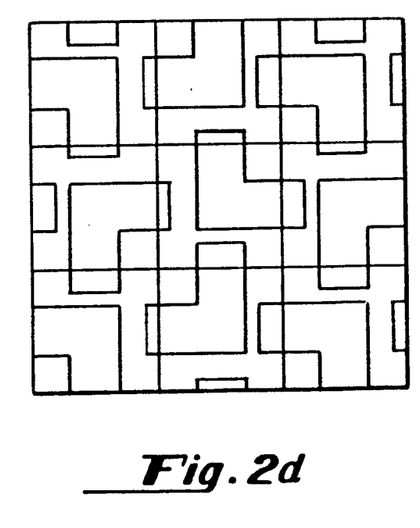

FIG. 2a shows a module which has been made according to the method of the present invention. This module includes lines only, and has been produced according to the steps represent by FIGS. 1a through 1d. FIGS. 2b through 2d show three designs made from the module of FIG. 2a. Each of the designs in FIGS. 2b through 2d contains nine modules. In general, the completed design can have as many modules as are necessary to cover the desired surface area. The completed design can be attached permanently to a solid substrate.

Note that in each of FIGS. 2b, 2c, and 2d, all of the modules are identical, and that some of the modules are oriented in the same way, and other modules are oriented differently. For example, the lower left and middle modules of FIGS. 2b and 2d are oriented in the same way, and the middle left and lower middle modules of FIGS. 2c and 2d are oriented in the same way. However, many of the other modules are oriented differently. These different orientations cause changes in the appearance of the overall design. In fact, even a change in orientation of only one module can cause a significant change in the appearance of the overall design.

FIGS. 2b through 2d illustrate the continuity of the design caused by the symmetry in the placement of the points on the sides of the squares. For example, note the "doughnut" structure defined by the four modules in the lower left hang region of FIG. 2c.

Figure 3A:
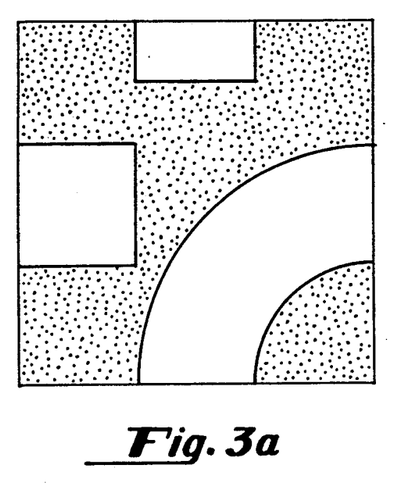
FIG. 3a is a drawing of another square module made according to the method of the present invention.
Figure 3B:
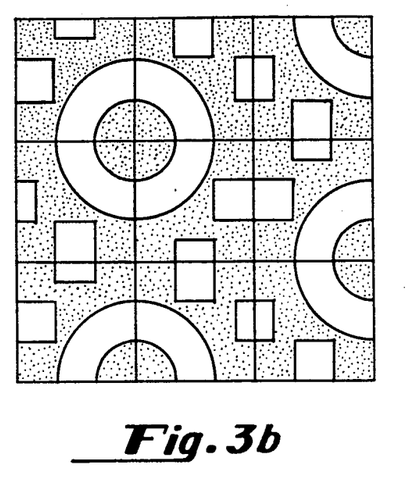
FIGS. 3b, 3c, and 3d are drawings of three designs made from the module of FIG. 3a, each design having nine modules, wherein only one module is altered from one design to the next.
Figure 3C:
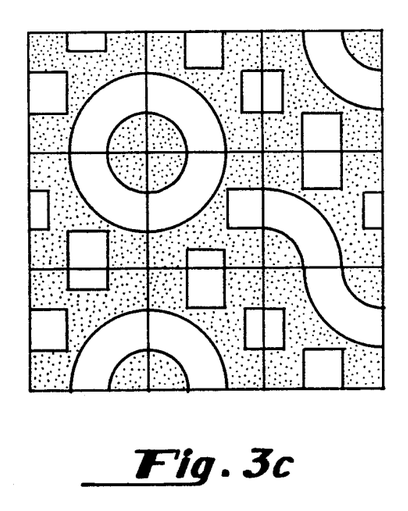
Figure 3D:
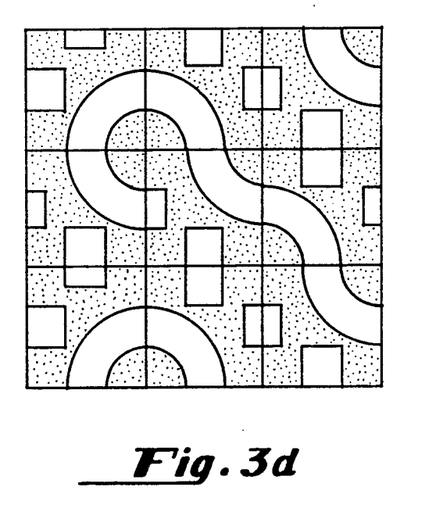

FIG. 3a shows another module made according the method described above. The design of the module is formed with straight and curved lines, and the space between the shapes thus formed is filled with a speckled pattern. FIGS. 3b, 3c, and 3d are designs made from the module of FIG. 3a, each design having nine modules. These nine-module designs show what happens when just one module is changed. Thus, FIG. 3c is the same as FIG. 3b, except that the middle right module has been rotated clockwise by 90°. Note the difference in appearance of the overall designs of FIGS. 3b and 3c. Similarly, FIG. 3d has been derived from FIG. 3c by rotating the middle module clockwise by 90°. Again, the two overall designs appear different, and both are different from FIG. 3b. As before, the number of modules can be increase to cover the desired surface area.

Figure 4A:
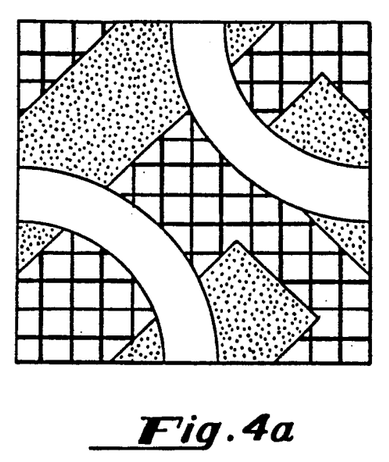
FIG. 4a is a drawing of another square module, having both lines and shapes, and having additional ornamentation, made according to the method of the present invention.

FIG. 4a shows another module made according to the present invention. Some of the spaces between lines are filled by blank space, and other spaces contain a speckle pattern. The entire design has been superimposed over a grid of alternating heavy and thin lines. This background grid is preferably formed first on the square, and the design of the present invention can be superimposed thereon.

Figure 4B:
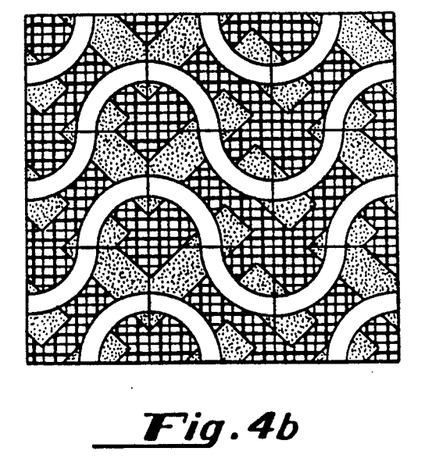
FIGS. 4b, 4c, and 4d are drawings of three designs made from the module of FIG. 4a, each design having nine modules.
Figure 4C:
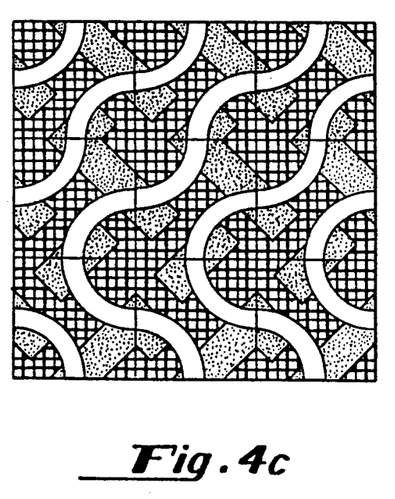
Figure 4D:
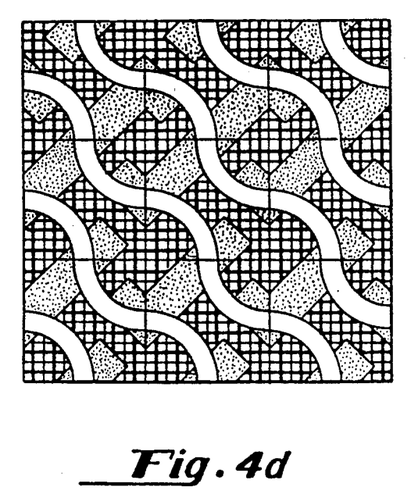

FIGS. 4b, 4c, and 4d show realizations of the design made from the module of FIG. 4a. For simplicity of illustration, these realizations again have nine squares each. FIGS. 4b through 4d show many examples of the continuity of the design from one module to the next.

The procedure described above, for making the modular design for a square, has a more general formulation in the case of other regular polygons. Suppose that the regular polygon to be used as a module has n sides. Then, when one connects the pairs of points chosen on the sides of the polygon, thereby drawing the lines forming the design, one must still observe the requirement that the lines be drawn such that the resulting pattern is not symmetrical around any straight line joining any pair of vertices of the polygon.

Alternatively, one could apply the less stringent rule that the design thus formed not be invariant under every rotation of the module by an integral multiple of $360/n$ degrees. One can restate this alternative as follows. One requires that there must exist some integer m, such that rotation of the module by $360m/n$ degrees produces a design which is not identical to that of the original, unrotated module. For example, if the regular polygon is a hexagon, and n is thus 6, there must be at least one integer m such that rotation of the hexagon by $60m$ degrees will produce a design that is not identical to the design on the unrotated hexagon.

Any design, formed on the polygon, which fulfills either of the above conditions, can be used to make a module for the present invention. The first case is preferred, however, as a module having an entirely asymmetrical design generally produces a more appealing final product. In practice, it is very easy to create asymmetric designs, since most sets of straight and-or curved lines, when chosen at random, will be entirely asymmetric.

Note that, in all of the designs made by assembling modules of the present invention, the modules create a larger pattern which is, in general, substantially different from the pattern on the individual modules. Moreover, although the modules are substantially identical, the larger pattern does not, in general, repeat itself. Thus, the design is termed "non-repetitive".

In preparation of the modules, it is not necessary to place actual marks at the midpoints of the sides of the square of other polygon. These marks are shown only for clarity of explanation. The marks could be made, if desired, and later erased when the module is completed. The same is true for the marks designating the other points.

The appearance of the final design is, of course, dependent on the number of points chosen on the side of the square or polygon, and on the amount of variation in the lines connecting these points. More variation will make the final design more interesting, but too much variation can lead to a final design which is not cohesive.

The method of making the design, described above, is capable of producing both amorphous and rigid geometrical shapes that are either enclosed or "run off" the side or sides of the larger design generated by the modules. Moreover, it is possible for these shapes to intersect each other.

The process can produce a large variety of modules. But whether an individual module is visually simple or complex, the larger design, formed by assembling the modules, maintains a high degree of unity. This phenomenon is due to the fact that the modules are identical.

Figure 5:
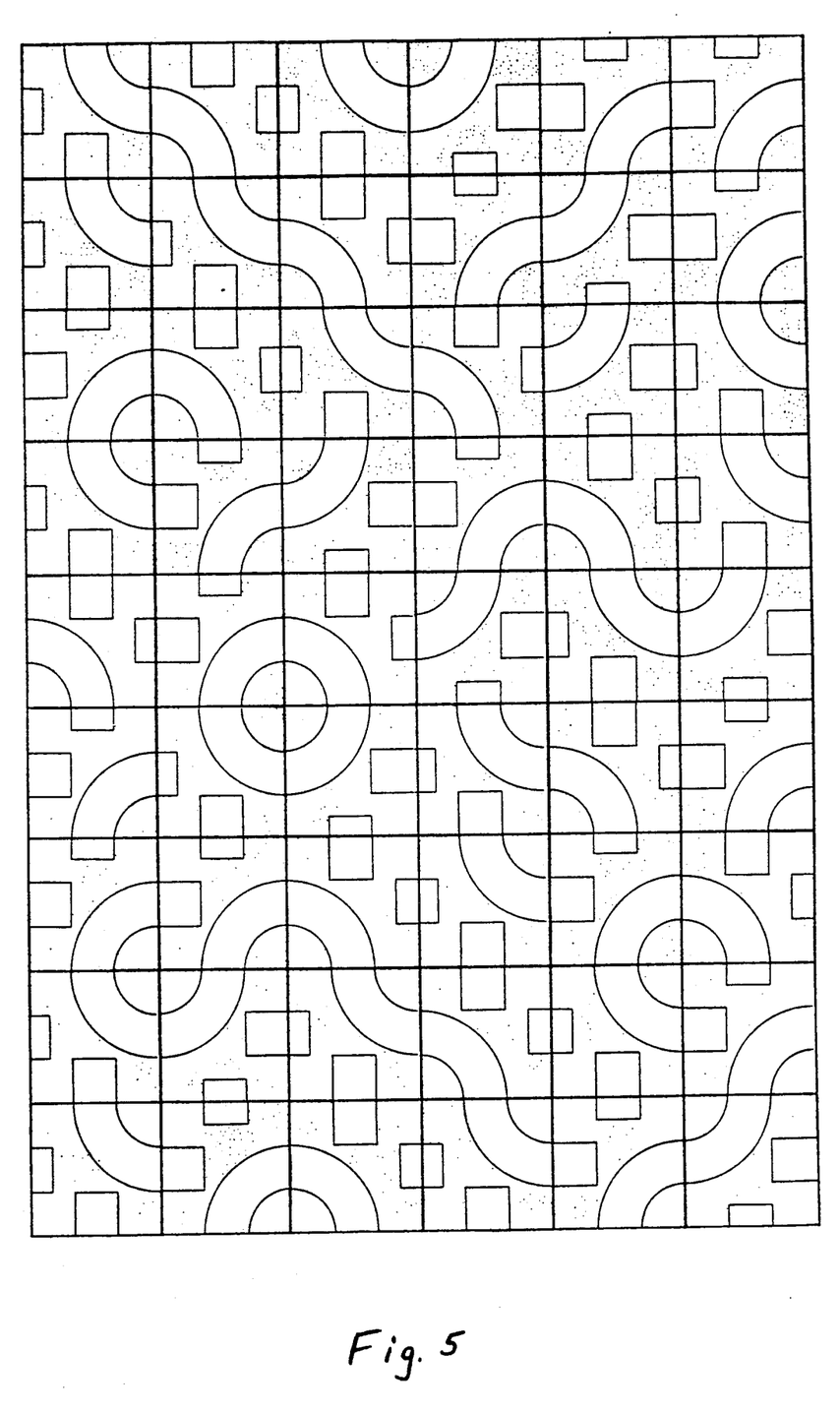
FIG. 5 is a drawing of a design made from the module shown in FIG. 3a, the figure showing a relatively large number of modules.

FIG. 5 shows a design made from the module of FIG. 3a, the design having 54 modules. FIG. 5 therefore illustrates one of the features of the invention, namely the creation of a larger design from a relatively large number of identical modules arranged with random orientations.

Because this process is able to generate such a variety of forms, and at the same time is able to maintain a high degree of unity, the process has many applications within the design industries.

For example, the present invention can be used in interior design. One example of such use is in making ceramic tiles or floor tiles. The advantage of the present invention, when used for this purpose, is that only one design for one tile needs to be created, yet the overall design does not repeat itself, and many variations of the design can be formed by distributing the tiles randomly.

Another application of the present invention in interior design is in making modular tables, or other modular furniture. Coffee tables or end tables can be made from sets of large cubes, having a side which is, say, two feet long. Each cube is identical, i.e. each face has a design made according to the above-described method, but the cubes can be placed in many different ways to create an endless variety of patterns.

The design of the present invention can also be used in decoration of fabrics, on wallpaper, on decorative cinder blocks, for use in the construction industry, and in decorative wrapping paper and packaging. In general, it can be used to decorate virtually any two-dimensional surface, including two-dimensional surfaces which occupy a three-dimensional space (such as a fabric). In the above examples, the design is permanently affixed to a substrate, such as a wall, a floor, or the surface of a piece of furniture.

The process of the present invention can also be used to construct a toy or puzzle consisting of a set of squares, or other regular polygons, which fit within a frame. A simple case would be that of sixteen squares which fit into a square frame, each square having a design made according to the method described with respect to FIG. 1 (i.e. using the steps of FIGS. 1a through 1d, with or without the addition of the step of FIGS. 1e or 1f). The appearance of the entire puzzle is changed every time the orientation of a square is changed. The puzzle can be an educational toy, a conversation piece, or a decoration for home or office, or all of the above.

Another use of the present invention is in making a toy or decorative item having the form of a set of cubes, similar to the device popularly known as the "Rubik's cube". For example, one can make 27 identical cubes, capable of being fitted together to form one large cube, each cube having identical designs on each side, but with differing orientations. The design on each side is made according to the method described with respect to FIG. 1. The cubes could be turned individually, thereby changing one of the squares of the design, and thus creating an overall design having a new appearance. This product could also serve as an educational toy, a decoration, a conversation piece, or any or all of these. One could also make a set of blocks which are not fastened into a cube, but which contain the basic module on each side, and which can be arranged in patterns of endless variety.

The present invention has the additional advantage that it can be practiced by virtually anyone, even by persons having limited artistic talent. Once the points on the sides of the square or other polygon are chosen, it is only necessary to connect pairs of points as described above, and to fill in the spaces, if desired. The design is formed simply by arranging the modules to cover a surface.

Furthermore, the entire design process can be performed by a computer, or by other mechanical means. It is a simple matter to program a computer to proceed through a large set of configurations of points, to generate connecting lines, and to fill in selected spaces. The program would include a step to insure that the design of the module is asymmetric, and to reject those modules whose designs turn out to be symmetrical. The resulting modules can be used to build elaborate and original designs.

After a design for a module is chosen, the computer can also be used to assemble the modules randomly to form the larger pattern.

A computer can also be used to generate a moving design which can be used as an art form. That is, the computer can be programmed to display an orientation of a plurality of identical modules, made according to the invention, and to vary continuously the orientation of one or more modules of the large design. The viewer can watch a screen, or other display device, while the large design changes with time. Each change in the design would be due only to the change in orientation of one or more modules. In other words, the computer can be used to generate one or more realizations of the design, and can be programmed to display a sequence of such realizations.

While the invention has been described with respect to certain embodiments, it is understood that the invention is not intended to be limited to what is shown. As explained above, any polygonal shape capable of covering a surface can be used for the basic module, and there are many ways by which the points and lines can be arranged. The designs can be combined with various conventional design elements, such as the grid background shown in FIG. 4a. There are also many other possible applications for use of the design.

It is also possible to make the modules with irregular polygons. For example, as noted above, it is a fact of geometry that any triangle can be duplicated and arranged to cover fully a given surface. In this case, the rules for selecting the points on the sides of the triangle would need to be modified, and there would be some limitations on the orientation of the modules, due to the requirement that the modules fit together. However, the underlying principles of the present invention, namely modular construction and continuity of the design from module to module, still apply. These and other similar variations should be deemed within the spirit and scope of the following claims.

What is claimed is:

1. A method of making a non-repetitive modular design, comprising the steps of:
    (a) providing a polygon, having a shape which is capable of being nested with other polygons of substantially identical shape and size and arranged to cover a surface, the polygon having vertices,
    (b) selecting a plurality of points along one side of the polygon, the points being arranged in a symmetrical pattern around the midpoint of the side of the polygon, all of said points being distinct from said midpoint and distinct from said vertices,
    (c) duplicating the pattern of points on the remaining sides of the polygon,
    (d) drawing lines connecting pairs of said points, such that each point is connected to one line, wherein the lines are drawn such that the resulting pattern does not have rotational symmetry,
    (e) making a plurality of copies of the polygon prepared according to steps (a) through (d), and
    (f) arranging said copies to cover said surface.

2. The method of claim 1, wherein the drawing step is followed by the step of filling a space between at least one pair of said lines with a design element.

3. The method of claim 1, wherein the drawing step is followed by the step of filling at least one space defined by at least one of the lines and at least one of the sides of the polygon, with a design element.

4. The method of claim 1, wherein the polygon is regular.

5. The method of claim 4, wherein the arranging step comprises the step of distributing the copies of the polygon in a random manner.

6. A method of making a non-repetitive modular design, comprising the steps of:
    (a) selecting at least one pair of points along the side of a polygon, the polygon having vertices, the points being arranged in a pattern which is symmetrical around the midpoint of a side of the polygon, the points being distinct from said midpoint and distinct from said vertices, the polygon being capable of being nested with other polygons of substantially identical shape and size and arranged to cover a surface,
    (b) reproducing the pattern of points on the remaining sides of the polygon, and
    (c) connecting the points with lines, such that each point is connected to one line, wherein the lines are drawn such that the resulting pattern does not have rotational symmetry.

7. The method of claim 6, wherein the polygon is regular.

8. The method of claim 7, further comprising the steps of duplicating the polygon made according to steps (a), (b), and (c), and arranging the duplicated polygons to cover at least part of said surface.

9. The method of claim 7, further comprising the steps of duplicating the polygon made according to steps (a), (b), and (c), and arranging the duplicated polygons to cover at least part of said surface.

10. The method of claim 6, wherein the method is performed on a display screen of a computer.

11. The method of claim 6, further comprising the step of filling at least one space defined by at least one of the lines with a design element.

12. A method of making modular furniture from a set of identical cubes, comprising the steps of:
 (a) forming a non-repetitive modular design by selecting at least one pair of points along the side of a square having vertices, the points being arranged in a patter which is symmetrical around the midpoint of the side of the square, the points being distinct from said midpoint and from the vertices of said square, reproducing the pattern of points on the remaining sides of the square, and connecting the points with lines, such that each point is connected to one line, and such that the resulting pattern does not have rotational symmetry,
 (b) duplicating the design formed in step (a) onto the faces of a cube,
 (c) making a plurality of copies of the cube formed in step (b), and
 (d) arranging the cubes formed in step (b) to form an item of furniture.

13. A method of decorating a surface, comprising the steps of:
 (a) forming a non-repetitive modular design by selecting at least one pair of points along the side of an element having the shape of a polygon having vertices, the points being arranged in a pattern which is symmetrical around the midpoint of a side of the polygon, the points being distinct from said midpoint and said vertices, the polygon being capable of being nested with other polygons of substantially identical shape and size and arranged to cover the surface, reproducing the pattern of points on the remaining sides of the polygon, and connecting the points with lines, such that each point is connected to one line, and such that the resulting pattern does not have rotational symmetry,
 (b) making copies of the design formed in step (a),
 (c) arranging said copies randomly over the surface, and
 (d) permanently fixing each of said copies in its position as determined in step (c).

14. The method of claim 13, wherein said surface is disposed on a structural member of a building.

15. The method of claim 14, wherein the surface is selected from the group consisting of walls, floors, and ceilings.

16. The method of claim 13, wherein said surface is disposed on a flexible manner such as a paper or fabric.

17. The method of claim 13, wherein the connecting step is followed by the step of filling the spaces between at least one pair of the lines with a design element.

18. The method of claim 13, wherein the connecting step is followed by the step of filling at least one space defined by at least one of the lines and at least one of the sides of the polygon, with a design element 19. The method of claim 4 or claim 7, wherein said polygon is selected from the group consisting of an equilateral triangle, a square, and a hexagon.

20. The method of claims 5, 8, 9 or 13, wherein said arranging step comprises arranging the duplicated regular polygons in a random manner so as to completely cover said surface exclusively with said duplicated regular polygons.

21. The method of claim 20, wherein each line in a given polygon is continuous with a corresponding line in an identical adjacent polygon.

22. The method of claim 4 or claim 7, wherein said lines exclusively connect points on nonadjacent sides of the polygon.

23. The method of claim 4 or claim 7, wherein at least two lines that are not separated by a substantially constant distance extend from at least one side of the polygon.

24. The method of claim 23, wherein said at least two lines extend from points that are symmetrical about the midpoint of said at least one side.

25. The method of claim 4 or claim 7, wherein at least one of said lines connects points on the same side of the polygon.

26. The method of claim 4 or claim 7, wherein said selecting step comprises selecting at least two pairs of points along one side of the polygon.

27. The method of claim 26, wherein at least two lines separated by a substantially constant distance are connected to said points on said one side of the polygon.

28. The method of claim 27, wherein said at least two lines are connected to respective pairs of points which are symmetrical about said midpoint.

29. The method of claim 28, wherein a design element is filled in a space defined between said at least two lines.

30. The method of claim 4 or claim 7, wherein at least two lines separated by a substantially constant distance are connected to points on non-adjacent sides of the polygon.

31. The method of claim 4 or claim 7, wherein at least two of said lines intersect.

32. The method of claim 1 or claim 6, wherein said steps (a), (b), and (c) are performed in that order.

33. A decorated surface produced according to the method of claim 20.

34. A decorated surface produced according to the method of claim 21.

35. A modular design produced according to the method of claim 22.

36. A modular design produced according to the method of claim 23.

37. A modular design produced according to the method of claim 24.

38. A modular design produced according to the method of claim 25.

39. A modular design produced according to the method of claim 26.

40. A modular design produced according to the method of claim 27.

41. A modular design produced according to the method of claim 28.

42. A modular design produced according to the method of claim 29.

43. A modular design produced according to the method of claim 30.

44. A decorated surface, comprising:

a plurality of identical non-repetitive design modules, each said module having the shape of a regular polygon having vertices, at least one pair of points being defined along each side of the module, the points being arranged in a pattern which is symmetrical around the midpoints of said sides, the points being distinct from said midpoint and said vertices;

the modules being capable of being nested with other modules of substantially identical shape and size and arranged to cover the surface;

each side of the modules having the same pattern of points, the points being connected with lines, such that each point is connected to one line, such that the resulting pattern does not have rotational symmetry;

said modules being arranged randomly over the surface, with said plurality of modules being arranged in a random manner so as to completely cover said surface exclusively with said identical modules, each line in a given module being continuous with a corresponding line in an identical adjacent module; and each of said modules being permanently fixed in its arranged position on said surface.

45. A non-repetitive design module comprising:

a regular polygon, the polygon having vertices;

at least one pair of points being defined along each side of the polygon, the points being arranged in a pattern which is symmetrical around the midpoint of each said side of the polygon, the points being distinct from said midpoint and distinct from said vertices, the polygon being capable of being nested with other polygons of substantially identical shape and size and arranged to cover a surface;

the pattern of points being identical on each of the sides of the polygon, and the points being connected with lines, such that each point is connected to one line, the lines being drawn such that the resulting pattern does not have rotational symmetry; and wherein at least one of said lines connects points on the same side of the polygon.

46. A non-repetitive design module, comprising:

a regular polygon, the polygon having vertices;

at least one pair of points being defined along each side of the polygon, the points being arranged in a pattern which is symmetrical around the midpoint of each said side of the polygon, the points being distinct from said midpoint and distinct from said vertices, the polygon being capable of being nested with other polygons of substantially identical shape and size and arranged to cover a surface;

the pattern of points being identical on each of the sides of the polygon, and the points being connected with lines, such that each point is connected to one line, the lines being drawn such that the resulting pattern does not have rotational symmetry; and wherein at least two pairs of points are defined along each side of the polygon.

47. The method of claim 46, wherein at least two lines separated by a substantially constant distance are connected to said points on said one side of the polygon.

48. The method of claim 47, wherein said at least two lines are connected to respective pairs of points which are symmetrical about said midpoint.

49. The method of claim 48, wherein a design element is filled in a space defined between said at least two lines.

50. A non-repetitive design module, comprising:

a regular polygon, the polygon having vertices;

at least one pair of points being defined along each side of the polygon, the points being arranged in a pattern which is symmetrical around the midpoint of each said side of the polygon, the points being distinct from said midpoint and distinct from said vertices, the polygon being capable of being nested with other polygons of substantially identical shape and size and arranged to cover a surface;

the pattern of points being identical on each of the sides of the polygon, and the points being connected with lines, such that each point is connected to one line, the lines being drawn such that the resulting pattern does not have rotational symmetry; and wherein at least two lines separated by a substantially constant distance are connected to points on non-adjacent sides of the polygon.

* * * * *